US012618424B2

(12) United States Patent
Schmidt et al.

(10) Patent No.: US 12,618,424 B2
(45) Date of Patent: May 5, 2026

(54) HYDRAULIC CONTROL SYSTEM AND METHOD WITH ELECTRO-PROPORTIONAL PRESSURE VALVE AND INTEGRAL CHECK

(71) Applicant: HydraForce, Inc., Lincolnshire, IL (US)

(72) Inventors: Travis Schmidt, Oregon City, OR (US); Valeriy Kazak, Des Plaines, IL (US); Brian Del Bene, Mundelein, IL (US)

(73) Assignee: HydraForce, Inc., Lincolnshire, IL (US)

( * ) Notice: Subject to any disclaimer, the term of this patent is extended or adjusted under 35 U.S.C. 154(b) by 0 days.

(21) Appl. No.: 18/630,837

(22) Filed: Apr. 9, 2024

(65) Prior Publication Data

US 2024/0255008 A1 Aug. 1, 2024

Related U.S. Application Data

(63) Continuation of application No. 17/179,130, filed on Feb. 18, 2021, now Pat. No. 11,953,031.

(60) Provisional application No. 62/978,053, filed on Feb. 18, 2020.

(51) Int. Cl.
| *F16K 17/04* | (2006.01) |
| *F15B 13/04* | (2006.01) |
| *F15B 13/043* | (2006.01) |
| *E02F 9/22* | (2006.01) |

(52) U.S. Cl.
CPC ...... *F15B 13/0402* (2013.01); *F15B 13/0433* (2013.01); *F15B 13/0435* (2013.01); *F16K 17/0473* (2013.01); *F16K 17/048* (2013.01);

*E02F 9/2207* (2013.01); *F15B 2211/522* (2013.01); *F15B 2211/526* (2013.01)

(58) Field of Classification Search
CPC .............. F15B 13/0402; F15B 13/0433; F15B 13/0435; F15B 13/024; F15B 13/027; E02F 9/2207; F16K 15/18; F16K 17/048; F16K 17/0473; F16K 11/0716
See application file for complete search history.

(56) References Cited

U.S. PATENT DOCUMENTS

| 6,267,350 B1 | 7/2001 | Slawinski et al. |
| 7,137,406 B2 | 11/2006 | Slawinski et al. |
| 10,437,269 B1 | 10/2019 | Bernd |

FOREIGN PATENT DOCUMENTS

CN 110792650 A 2/2020

OTHER PUBLICATIONS

European Patent Office, International Search Report and the Written Opinion in International Application No. PCT/US2021/018598 (May 10, 2021).

*Primary Examiner* — Kelsey E Cary
(74) *Attorney, Agent, or Firm* — Leydig, Voit & Mayer, Ltd.

(57) ABSTRACT

A hydraulic control assembly includes means for holding pressure in a cylinder to inhibit boom or arm drop of a machine in the event that a hose between the cylinder and a main control valve (MCV) ruptures. The pressure holding means of the hydraulic control assembly include a hydraulic valve and a parts-in-body check assembly both configured for insertion into a valve cavity defined by a valve body. The hydraulic valve comprises a proportional piloted valve that controls pressure.

4 Claims, 4 Drawing Sheets

HYDRAULIC CONTROL SYSTEM AND METHOD WITH ELECTRO-PROPORTIONAL PRESSURE VALVE AND INTEGRAL CHECK

CROSS-REFERENCE TO RELATED APPLICATIONS

This patent application is a continuation of U.S. patent application Ser. No. 17/179,130, filed Feb. 18, 2021, and entitled, "Hydraulic Control System and Method with Electro-Proportional Pressure Valve and Integral Check," which, in turn, claims the benefit of priority to U.S. Provisional Patent Application No. 62/978,053, filed Feb. 18, 2020, and entitled, "Electro-Proportional Pressure Valve with Integral Check and Hydraulic Control System and Method," which are incorporated in their entirety herein by this reference.

TECHNICAL FIELD

This patent disclosure relates generally to a hydraulic valve and, more particularly, to a hydraulic control assembly with an electro-proportional pressure valve and an integral check safety feature in the event of a loss in hydraulic fluid, such as when a hose ruptures or bursts.

BACKGROUND

Machines such, as excavators and backhoe loaders, typically include a lifting linkage comprising an assembly of parts (e.g., a combination of a boom and an arm) used for raising and lowering a lift point for use in an object handling process. The machine can include a linkage control system comprising a hydraulic circuit having a plurality of hydraulic control components used for raising and lowering the lift point in object handling applications.

When such machines are used for object handling, a failure or rupture in the hydraulic circuit could endanger persons under raised loads and could damage the lifting linkage. These risks can be reduced by applying a lowering control device for controlled lowering of the load in the case of a hydraulic line failure or rupture.

Conventional solutions use a pilot-operated proportional poppet that controls the flow between the boom and the main control valve. The proportional poppet is controlled via remote pilot pressure that can come from either a pilot-operated joystick or an electro-proportional pressure reducing/relieving valve. In some cases, the electro-proportional valve is integrated with the proportional poppet into one casting or manifold, but a separate component within the assembly.

There is a continued need in the art to provide additional solutions to enhance the use and safety of hydraulic circuits over a range of conditions. For example, there is a continued need for techniques for maintaining a load in position and/or for controlled lowering of the load in the event that there is a loss of hydraulic fluid in the circuit, such as, in the case of a hydraulic line failure or rupture.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a hydraulic control assembly. In embodiments, a hydraulic control assembly includes means for holding pressure in a cylinder to inhibit boom or arm drop of a machine in the event that a hose between the cylinder and a main control valve (MCV) ruptures.

In one embodiment, a hydraulic control assembly includes a body, a hydraulic valve, and a check assembly. The body defines a valve cavity, a first port, a second port, and a third port. Each of the first port, the second port, and the third port are in fluid communication with the valve cavity. The first port is adapted to be fluidly connected to a cylinder of a hydraulic circuit, the second port is adapted to be fluidly connected to a main control valve (MCV) of the hydraulic circuit through which the second port is fluidly connected to a source of hydraulic fluid, and the third port is adapted to be fluidly connected to a tank of the hydraulic circuit. The hydraulic valve is mounted to the body such that the hydraulic valve is at least partially disposed within the valve cavity. The hydraulic valve comprises an electro-proportional pressure valve and has a nose. The check assembly is disposed within the valve cavity and in abutting relationship with the hydraulic valve such that the check assembly is seated against the nose of the hydraulic valve.

The check assembly is configured to permit a flow of hydraulic fluid from the second port to the first port through the check assembly and to prevent the flow of hydraulic fluid from the first port to the second port through the check assembly. The hydraulic valve is configured to permit the flow of hydraulic fluid from the first port to the second port through the hydraulic valve once a load pressure at the first port exceeds a threshold pressure and to block the flow of hydraulic fluid from the first port to the second port when the load pressure is below the threshold pressure.

In still another aspect, embodiments of a method of controlling a hydraulic circuit are disclosed. In one embodiment, a method of controlling a hydraulic circuit can be used to control a hydraulic circuit including a pump, a main control valve (MCV), a body, a hydraulic valve, a check assembly, a cylinder, and a tank. The body defines a valve cavity, a first port, a second port, and a third port. Each of the first port, the second port, and the third port are in fluid communication with the valve cavity. The first port is fluidly connected to the cylinder, the second port is fluidly connected to the MCV through which the second port is fluidly connected to a source of hydraulic fluid from the pump, and the third port is fluidly connected to the tank. The hydraulic valve is mounted to the body such that the hydraulic valve is at least partially disposed within the valve cavity. The hydraulic valve comprises an electro-proportional pressure valve and has a nose. The check assembly is disposed within the valve cavity and is in abutting relationship with the hydraulic valve such that the check assembly is seated against the nose of the hydraulic valve. The method includes performing a lifting operation in which a flow of pressurized hydraulic fluid is conveyed from the second port to the first port through the check assembly. A coil of the hydraulic valve is maintained in a de-energized condition during the lifting operation.

Further and alternative aspects and features of the disclosed principles will be appreciated from the following detailed description and the accompanying drawings. As will be appreciated, the hydraulic control assemblies, the hydraulic circuits, and methods disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

Figure 1:
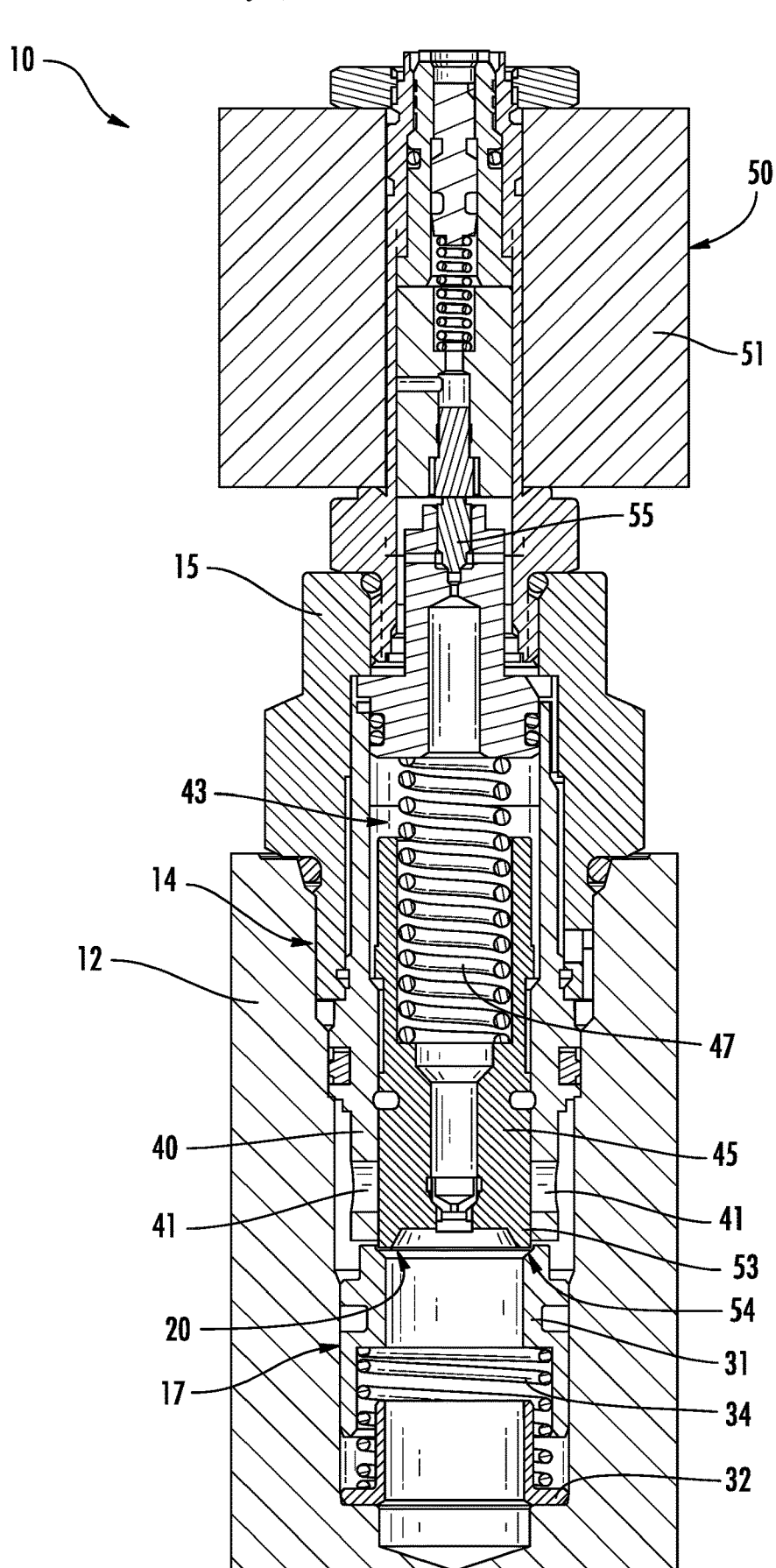
FIG. 1 is a generally schematic, sectional elevation view of an embodiment of a hydraulic control assembly including a body defining a valve cavity, an embodiment of a hydraulic valve constructed in accordance with principles of the present disclosure, shown in a sectional elevation view, disposed in the cavity and an embodiment of a check valve assembly constructed in accordance with principles of the present disclosure disposed in the cavity and abutting the hydraulic valve.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

In embodiments, a hydraulic control assembly includes means for holding pressure in a cylinder to inhibit boom or arm drop of a machine in the event that a hose between the cylinder and a main control valve (MCV) ruptures. In embodiments, the pressure holding means includes an embodiment of a hydraulic valve and of a check assembly constructed according to principles of the present disclosure.

Embodiments of a hydraulic control assembly constructed according to principles of the present disclosure include a means for electro-proportionally holding pressure in the cylinder. In embodiments, the electro-proportional pressure holding means includes an embodiment of a hydraulic valve and of a check assembly constructed according to principles of the present disclosure.

Embodiments of a hydraulic control assembly constructed according to principles of the present disclosure include an electro-proportional pressure valve with an integral check safety feature in the event of a loss in hydraulic fluid, such as when a hose ruptures or bursts. The hydraulic control assembly can be configured to hold the load of the boom or arm in the event of a hose rupture between the actuator and the MCV by means of pressure control while having free reverse flow.

Embodiments of a hydraulic control assembly constructed according to principles of the present disclosure can include a hydraulic valve and a check assembly both configured for insertion into a valve cavity defined by a body. In embodiments, the hydraulic valve comprises a proportional piloted valve that controls pressure. In embodiments, the hydraulic valve comprises an electro-proportional pressure valve including a coil assembly with a coil wherein the threshold pressure is inversely proportional to an electrical current input to the coil. In embodiments, the hydraulic control assembly includes a "parts-in-body" check valve that is disposed within the valve cavity of the body. In embodiments, the parts-in-body check valve is engaged with the nose of the hydraulic valve, which acts as its seat. In embodiments, the parts-in-body check valve is less expensive and more compact than using an integral check within a cartridge valve.

Embodiments of a hydraulic control system and of a method of controlling a hydraulic system following principles of the present disclosure are adapted to control the operation of one or more hydraulic cylinders and to maintain a load of the cylinder in position and/or to controllably lower the load in the event that there is a loss of hydraulic fluid in the circuit, such as, in the case of a hydraulic line failure or rupture. Techniques and principles of the present disclosure can be used for operating a lifting linkage of a machine, such as an excavator or loader, or other systems requiring additional load-holding/load-controlling safety in the event of a loss of hydraulic fluid.

Embodiments of a hydraulic valve in the form of a screw-in or threaded cartridge valve constructed according to principles of the present disclosure can be easily serviceable. For example, a threaded hydraulic cartridge valve constructed according to principles of the present disclosure can be easily removed and replaced as part of an efficient service program.

Embodiments of a hydraulic control assembly constructed according to principles of the present disclosure can be configured to provide two functions in one cavity: pressure control and free reverse flow check. Embodiments of a hydraulic control assembly constructed according to principles of the present disclosure can include a proportional hydraulic valve that is internally piloted with no need for an additional pilot line or pilot source.

Figure 2:
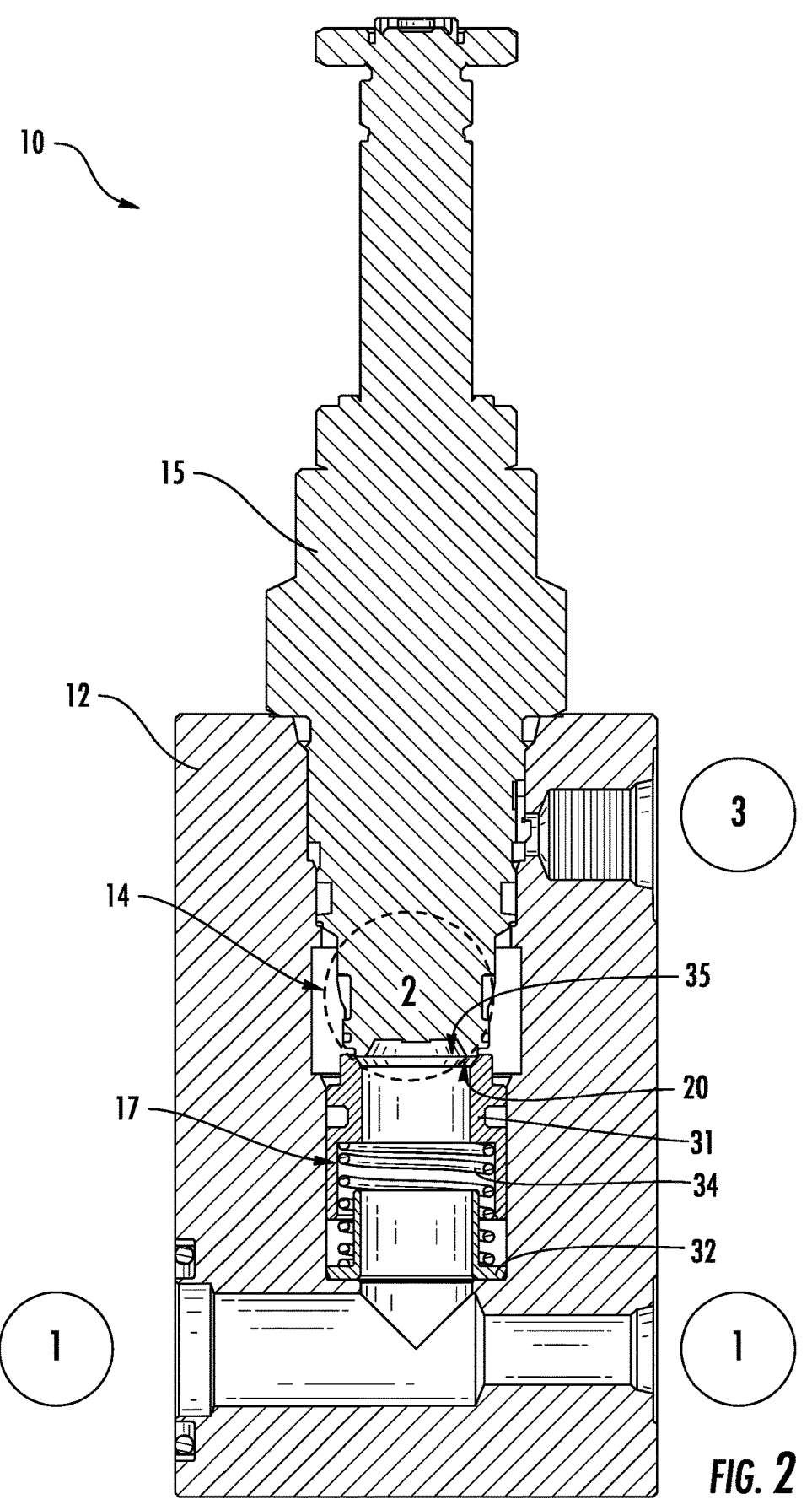
FIG. 2 is a view similar to that shown in FIG. 1, but along a plane at ninety degrees relative to the view shown in FIG. 1 and with a coil removed from the hydraulic valve and the hydraulic valve shown in simplified schematic form for illustrative purposes.

Turning now to the Figures, an embodiment of a hydraulic control assembly 10 constructed according to principles of the present disclosure is shown in FIGS. 1 and 2. The illustrated hydraulic system 10 includes a body 12 defining a valve cavity 14, an embodiment of a hydraulic valve 15 constructed according to principles of the present disclosure, and a check assembly 17. The hydraulic valve 15 and the check assembly 17 are both configured for insertion into the valve cavity 14 defined by the body 12. In the illustrated embodiment, the hydraulic valve 15 comprises a proportional piloted valve that controls pressure. In the illustrated embodiment, the check assembly 17 comprises a parts-in-body check valve that is disposed within the valve cavity 14 of the body 12. In the illustrated embodiment, the parts-in-body check valve 17 is engaged with a nose 20 of the hydraulic valve 15, which acts as the seat of the check valve 17.

Referring to FIG. 2, the body 12 defines the valve cavity 14, a first $port_1$, a second $port_2$, and a third $port_3$ which are each in fluid communication with the valve cavity 14. Each of the first $port_1$, the second $port_2$, and the third $port_3$ are in fluid communication with the valve cavity 14. The hydraulic valve 15 is mounted to the body 12 such that the hydraulic valve 15 is at least partially disposed within the valve cavity 14. In embodiments, the hydraulic valve 15 comprises an electro-proportional pressure valve. The check assembly 17 is disposed within the valve cavity 14 and is in abutting relationship with the hydraulic valve 15 such that the check assembly 17 is seated against the nose 20 of the hydraulic valve 15.

In the illustrated embodiment, the check assembly 17 is configured to permit a flow of hydraulic fluid from the second port$_2$ to the first port$_1$ through the check assembly 17 and to prevent a flow of hydraulic fluid from the first port$_1$ to the second port$_2$ through the check assembly 17. In the illustrated embodiment, the hydraulic valve 15 is configured to selectively permit a flow of hydraulic fluid from the first port$_1$ to the second port$_2$ through the hydraulic valve 15 once a load pressure at the first port$_1$ exceeds a threshold pressure and to block the flow of hydraulic fluid from the first port$_1$ to the second port$_2$ when the load pressure is below the threshold pressure.

Figure 3:
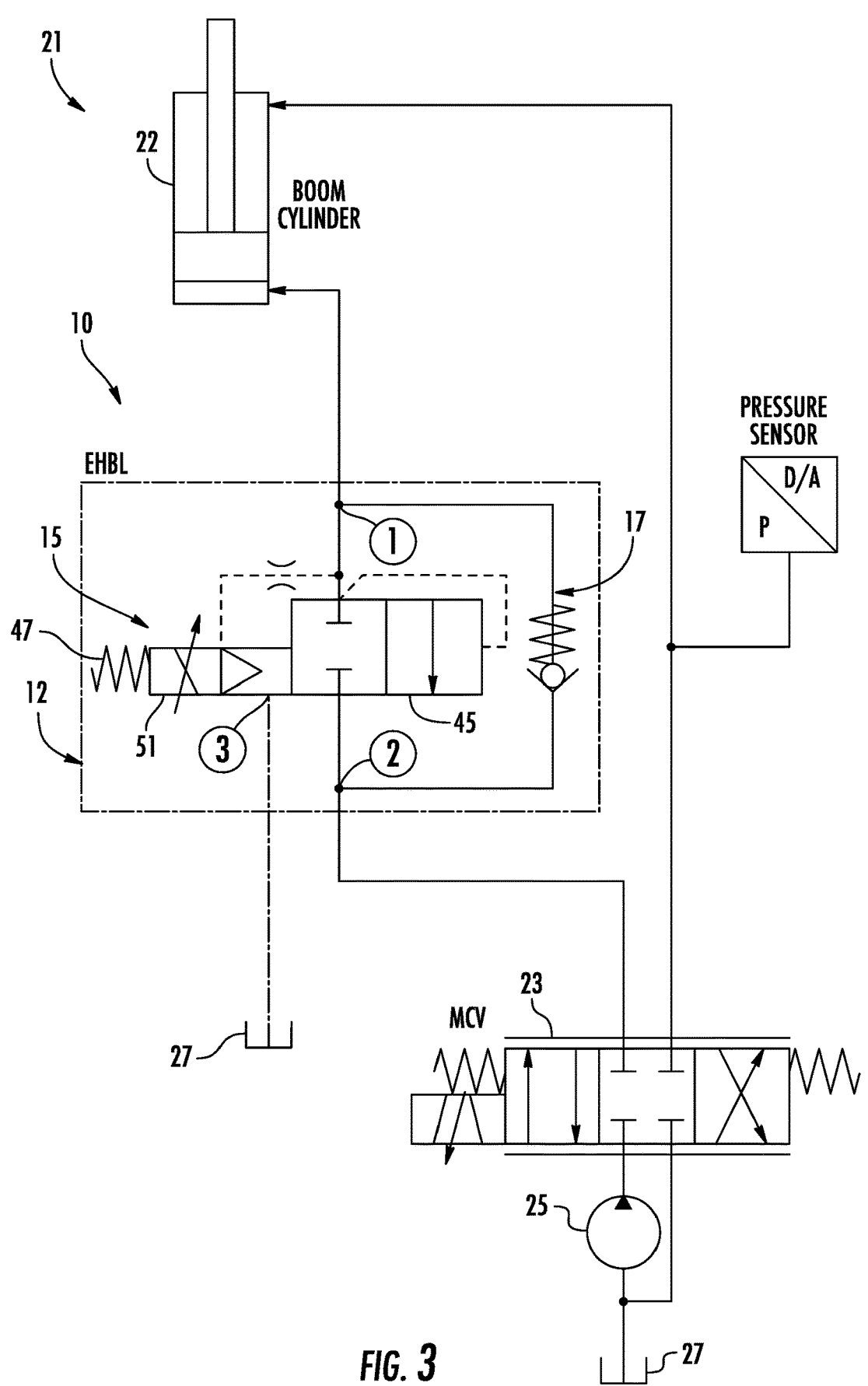
FIG. 3 is a schematic view of an embodiment of a hydraulic circuit constructed in accordance with principles of the present disclosure, including the hydraulic control assembly of FIG. 1.

Referring to FIGS. 2 and 3, the first port$_1$ of the body 12 is adapted to be fluidly connected to a cylinder 22 of a hydraulic circuit 21 of a lifting linkage system of a machine. The second port$_2$ is adapted to be fluidly connected to a main control valve (MCV) 23 of the hydraulic circuit 21 of the lifting linkage system and through which it is fluidly connected to a source of hydraulic fluid supplied by a pump 25. The third port$_3$ is adapted to be fluidly connected to a tank 27 of the hydraulic circuit 21. The tank 27 is in fluid communication with the pump 25 so that the pump 25 can selectively draw hydraulic fluid from the tank 27 to provide the source of pressurized hydraulic fluid.

In the illustrated embodiment, the hydraulic control assembly 10 is adapted to permit a flow of hydraulic fluid from the second port$_2$ to the first port$_1$ so that the MCV 23 can selectively control the cylinder 22 of the lifting linkage system to perform a lifting operation. The hydraulic control assembly 10 is adapted to permit a flow of hydraulic fluid from the first port$_1$ to the second port$_2$ so that the MCV 23 can selectively control the cylinder 22 of the lifting linkage system to perform a lowering operation. The hydraulic control assembly 10 is adapted to permit a flow of hydraulic fluid from the first port$_1$ to the third port$_3$ to perform a pressure relief operation.

Referring to FIG. 2, the illustrated check assembly 17 includes a check poppet 31, a poppet guide 32, and a check spring 34. The check poppet 31 and the poppet guide 34 are each hollow and cylindrical. The check poppet 31 is in abutting relationship to the nose 20 of the hydraulic valve 15. The poppet guide 32 is disposed remotely from the hydraulic valve 15 (relative to the check poppet 31) and is in engaged relationship with the body 12. The check spring 34 is disposed around the poppet guide 32 and within a counterbore defined by the check poppet 31 such that the check spring 34 is interposed between the check poppet 31 and the poppet guide 32. The check spring 34 is adapted to generate a check spring force to urge an exterior surface 35 of the check poppet 31 into engaging relationship with the nose 20 of the hydraulic valve 15 to fluidly prevent the flow of hydraulic fluid from the first port$_1$ to the second port$_2$ through the check assembly 17. The check spring 34 acts to urge the check poppet 31 into occluding relationship with the second port$_2$ relative to the first port$_1$.

In the illustrated embodiment, the check assembly 17 is configured such that the flow of hydraulic fluid from the second port$_2$ to the first port$_1$ sufficient to overcome the check spring force of the check spring 34 moves the check poppet 31 away from the nose 20 of the hydraulic valve 15 toward the poppet guide 32 into an open position in which the flow of hydraulic fluid from the second port$_2$ to the first port$_1$ is permitted. A flow of hydraulic fluid hydraulic fluid from the first port$_1$ to the third port$_3$ is permissible through the interior of the hollow components of the check assembly 17 and the hydraulic valve 15 provided the pressure is sufficient to open the hydraulic valve 15.

Referring to FIG. 1, in the illustrated embodiment, the hydraulic valve 15 includes a cage 40 defining a plurality of cross holes 41 and an axial bore 43. The cross holes 41 are in fluid communication with the axial bore 43. The cross holes 41 are in fluid communication with the second port$_2$ of the body 12, and the axial bore 43 is in fluid communication with the first port$_1$ of the body 12.

The hydraulic valve 15 includes a movable member 45 in the form of a spool which is configured to selectively occlude the cross holes 41 defined in the cage 40 of the hydraulic valve 15 to fluidly isolate the first port$_1$ and the second port$_2$ from each other. The spool 45 is disposed within the axial bore 43 of the cage 40 and is axially movable over a range of travel with respect to the cage 40 between a closed position in which the spool 45 occludes the cross holes 41 to fluidly isolate the first port$_1$ and the second port$_2$ from each other and an open position in which the first port$_1$ and the second port$_2$ are in fluid communication with each other through the cage 40. In the illustrated embodiment, a spool spring 47 is arranged with the spool 45 to generate a spring force against the spool 45 to bias the spool 45 to the closed position such that the flow of hydraulic fluid from the first port$_1$ to the second port$_2$ is blocked until the load pressure at the first port$_1$ is sufficient to overcome the spring force of the spool spring 47 to move the spool 45 to the open position.

In embodiments, the hydraulic valve 15 comprises an electro-proportional pressure valve including a coil assembly 50 with a coil 51 wherein the threshold pressure is inversely proportional to an electrical current input to the coil 51. When the coil assembly 50 of the hydraulic valve 15 is de-energized, the spool 45 is in a normally-closed position in which the first port$_1$ and the second port$_2$ are fluidly isolated from each other through the hydraulic valve 15. When the coil assembly 50 of the hydraulic valve 15 is energized, the spool 45 can be moved to one of a range of open positions in which a flow of hydraulic fluid is permitted from the first port$_1$ to the second port$_2$ through the cross holes 41 of the cage 40 of the hydraulic valve 15.

In embodiments, at least one component of the check assembly 17 is seated against the nose 20 of the hydraulic valve 15. In embodiments, the nose 20 of the hydraulic valve 15 comprises any portion of a distal end 53 of the hydraulic valve 15 which is inserted in the body 12. In embodiments, the nose 20 of the hydraulic valve 15 against which the check assembly 17 is seated comprises at least one of the cage 40 and the movable member 45. In the illustrated embodiment, the nose 20 of the hydraulic valve 15 against which the check assembly 17 is seated comprises the spool 45. The check poppet 31 can include a chamfer surface 54 configured to facilitate the engagement of the check poppet 31 with the nose 20 of the hydraulic valve 15. In embodiments, the nose 20 of the hydraulic valve against which the check assembly 17 is seated can include either only the cage 40 or the cage 40 and the spool 45. In embodiments, the spool 45 is seated against the cage 40, and the check assembly 17 is seated against the cage 40.

In embodiments, the hydraulic valve 15 is configured such that the flow of hydraulic fluid from the first port$_1$ to the second port$_2$ is pressure relieved to the third port$_3$ through the hydraulic valve 15. In the illustrated embodiment, when permitted, the flow of hydraulic fluid from the first port$_1$ to the second port$_2$ can be pressure relieved to the third port$_3$ through the hydraulic valve 15 wherein the main poppet mimics the small poppet.

In the illustrated embodiment, the check assembly 17 is arranged such that the load pressure at the first port$_1$ acts upon the movable member 45 of the hydraulic valve 15 through the hollow interior of the check poppet 31, the poppet guide 32, and the check spring 34. The check assembly 17 and the hydraulic valve 15 are configured such that a flow of hydraulic fluid from the first port$_1$ to the third port$_3$ is permissible through the hollow interior of the check assembly 17 and the hydraulic valve 15 provided the flow of hydraulic fluid generates a pressure sufficient to open a pilot poppet 55 of the hydraulic valve 15.

Referring to FIG. 3, the hydraulic control assembly 10 can be used to perform a lifting operation in which a flow of pressurized hydraulic fluid is conveyed from the second port$_2$ to the first port$_1$ through the check assembly 17. In embodiments, the hydraulic control assembly is configured to act as an electro-hydraulic boom lock (EHBL). During the lift operation, the coil 51 of the hydraulic valve 15 is de-energized. In the event that there is a loss of hydraulic fluid in the hydraulic circuit 21, such as, in the case of a hydraulic line failure or rupture, for example, the check assembly 17 is configured to block the flow of hydraulic fluid from the cylinder 22 (i.e., from the first port$_1$ to the second port$_2$) to maintain the load in position. Should the pressure in the cylinder 22 exceed a predetermined limit, the main spring 47 of the hydraulic valve 15 can be overcome to provide a pressure relief function in which fluid is conveyed from the first port$_1$ to the third port$_3$ through the valve 15.

The hydraulic control assembly 10 can be used to perform a lowering operation in which a flow of pressurized hydraulic fluid is conveyed from the first port$_1$ to the second port$_2$ through the hydraulic valve 15. The coil 51 of the hydraulic valve 15 is energized to proportionally reduce the effective force exerted by the main spring 47 of the hydraulic valve 15 to resist movement of the spool 45 to the open position to help perform a controlled lowering operation. During the lowering operation, pressurized fluid in the cylinder 22 can flow from the first port$_1$ to the second port$_2$ via the cross-holes 41 of the cage 40 of the hydraulic valve 15.

It will be understood that, in other embodiments, the hydraulic control assembly 10 can be configured to selectively and independently operate a plurality of hydraulic valves and associated check assemblies constructed according to principles of the present disclosure. It will be understood that, in embodiments, the hydraulic control assembly 10 can include other and different components. In other embodiments, it will be understood that a hydraulic control assembly constructed according to principles of the present disclosure can be used in an application other than a lifting linkage system.

Figure 4:
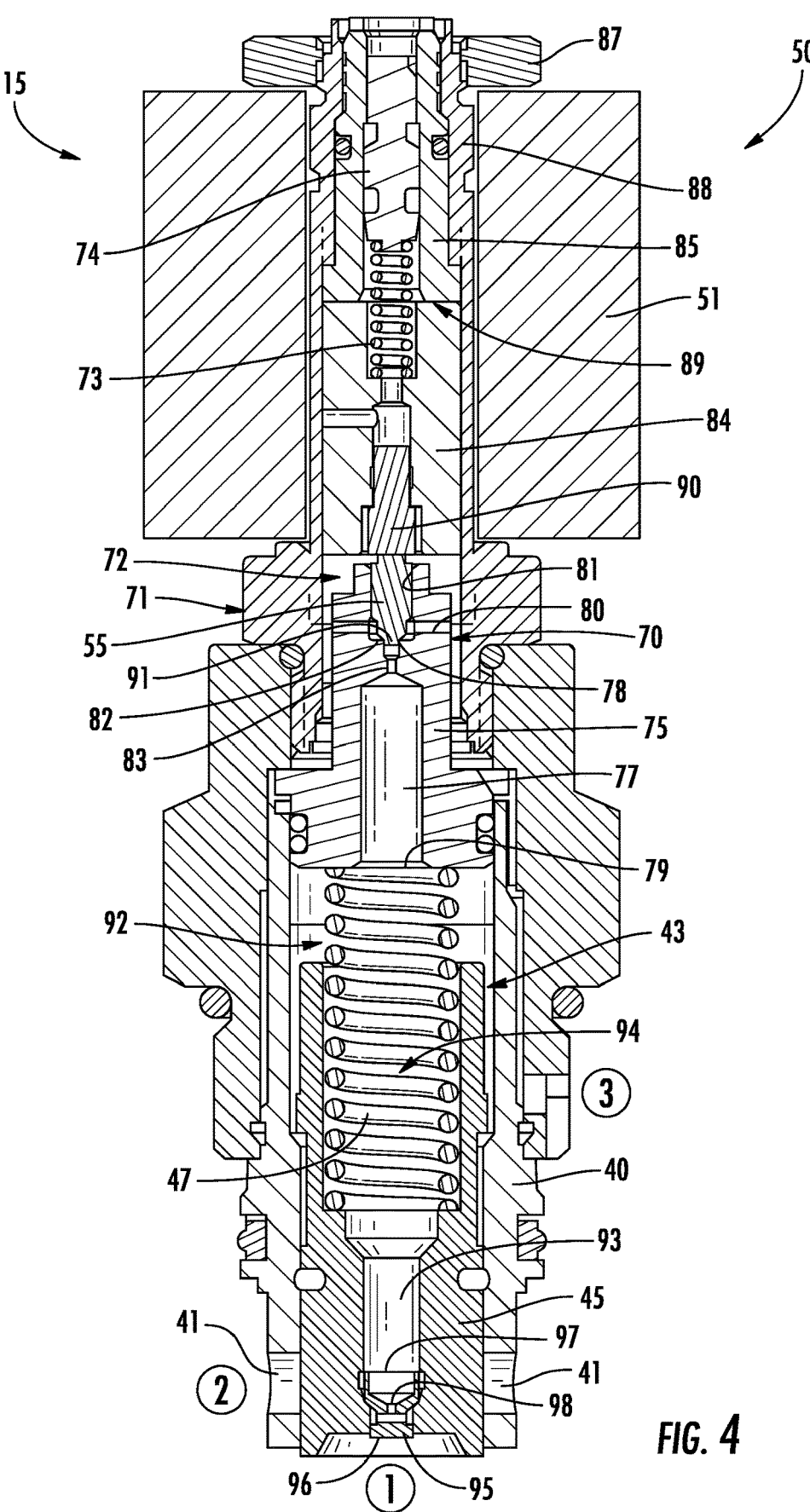
FIG. 4 is a sectional elevation view of the hydraulic valve of FIG. 1.

Referring to FIG. 4, the hydraulic valve 15 is suitable for use in embodiments of a hydraulic control assembly constructed according to principles of the present disclosure is shown in a closed position. The hydraulic valve 15 comprises a screw-in, cartridge-style, pilot-operated, hydraulic pressure relief valve, which can be adjusted across a pre-scribed range using a variable electric input to the coil 51 of its coil assembly 50. The hydraulic valve 15 comprises a two-stage valve in which a main element 45 is controlled by a pilot element 70 via a smaller flow, called a pilot flow.

Pressure output is inversely proportional to the current input to the coil 51 of the coil assembly 50. The hydraulic valve 15 is configured to block hydraulic flow from the first port$_1$ to the second port$_2$ until sufficient pressure is present at the first port$_1$ to move the spool 45 to an open position by overcoming the preset induced spring force. With no current applied to the coil 51, the valve 15 will relieve within a predetermined range of the spring maximum. Applying current to the coil 51 of the coil assembly 50 reduces the induced spring force, thereby reducing the valve setting. The regulated pressure is inversely proportional to the input electrical current to the coil 51 of the coil assembly 50.

The hydraulic valve 15 includes a valve body 71 connected to the cage 40 and defining an internal cavity 72 that is fluidly connectable with the bore 43 of the cage 40. A pilot-operated valve 70 is disposed intermediately with respect to the cage 40 and the valve body 71 to fluidly isolate the internal cavity 72 of the valve body 71 from the bore 43 of the cage 40. The pilot-operated valve 70 is subjected to a hydraulic opening force of pilot fluid that is present in the bore 43 of the cage 40. A pilot spring 73 is disposed within the internal cavity 72 of the valve body 71 and is arranged to subject the pilot-operated valve 70 to a closing spring force. An adjustable plug 74 is disposed within the valve body 71 and is adapted to adjust the closing spring force applied by the pilot spring 73.

The pilot-operated valve includes a housing 75 fixedly disposed within the cavity 72 of the valve body 71. The housing 75 includes a longitudinal passageway 77 having an interior opening 78 and an external opening 79. The longitudinal passageway 77 is in communication with a transverse pilot passageway 80 and a longitudinal bore 81. The housing 75 includes a pilot seat 82 circumscribing the interior opening 78 of the longitudinal passageway 77. The housing 75 can define a damping orifice 83 that communicates with the longitudinal passageway 77 so that the housing defines a restricted axial passageway with a pilot hole disposed adjacent the poppet 55, a radial passageway or pilot tank connection via the transverse pilot passageway, and an axial poppet bore within which the pilot poppet 55 is disposed.

The pilot poppet 55 is moveably disposed within the axial poppet bore portion of the longitudinal bore 77 of the housing 75. The pilot poppet 55 is adapted to sealingly engage the pilot seat 82. When the pilot poppet 55 is unseated from the pilot seat 82, the first port$_1$ is placed in fluid communication with the third port$_3$ via the transverse pilot passageway 80.

The coil assembly 50 is mounted to the valve body 71. The hydraulic valve 15 is configured such that, when the coil assembly 50 of the hydraulic valve 15 is de-energized, the movable member 45 is in a normally-closed position in which the first port$_1$ and the second port$_2$ are fluidly isolated from each other through the hydraulic valve 15, and, when the coil assembly 50 of the hydraulic valve 15 is energized, the movable member 45 can be moved to one of a range of open positions in which a flow of hydraulic fluid is permitted from the first port$_1$ to the second port$_2$ through the cross holes 41 of the cage 40.

The coil assembly 50 includes the coil 51, an armature 84, and a pole piece 85. The coil 51 is disposed around the armature 84. The pole piece 85 and the armature 84 are disposed within the internal cavity 72 of the valve body 71. The pilot spring 73 is disposed between the pole piece 85 and the armature 84. The armature 84 is disposed between the pilot spring 73 and the pilot-operated valve 70. An electric current applied to the coil 51 provides a magnetic force acting on the armature 84 that causes motion of the armature 84 toward the pole piece 85 such that the closing spring force can be selectively adjusted, thereby adjusting the threshold pressure of the hydraulic valve 15.

A retainer nut 87 is mounted to an actuator tube 88 which comprises a part of the valve body 71 and which has a generally cylindrical bore forming part of the internal valve cavity 72. The retainer nut 87 is mounted to the actuator tube 88, a portion of which is threadedly engaged within the central bore of the retainer nut 87. The retainer nut 87 is configured to secure the coil 51 of the coil assembly 50 to the actuator tube 88. The coil assembly 50 of the hydraulic valve 15 can include a coil frame containing the coil 51 circumferentially mounted on the actuator tube 88.

The housing 75 is fixed within the bore of the actuator tube 88. The pole piece 85 is fixed within the bore of the actuator tube 88 and has a generally cylindrical axial bore and a downwardly facing surface. The adjustable plug 74 acts as a pilot spring adjuster and is seated within the bore of the pole piece 85.

The armature 84 is slidably disposed within the bore of the actuator tube 88 adjacent the spring adjuster 74. The armature 84 has a generally cylindrical axial bore and an upwardly facing surface. The pilot spring 73 is disposed within the axial bore of the pole piece 85 and the axial bore of the armature 84. The pilot spring 73 abuts the spring adjuster 74 and the armature 84 to provide a biasing force against the armature 84 to resists its movement toward the pole piece 85 when an electrical current is applied to the coil 51.

In embodiments, a gap 89 is defined by the downwardly facing surface of the pole piece 85 and the upwardly facing surface of the armature 84. The gap 89 can have a generally frustoconical shape and extend around the perimeter of the pilot spring 73. In embodiments, a flexible, non-magnetic washer can be disposed within the gap 89 to help prevent the buildup of residual magnetism between the pole piece 85 and the armature 84. While the gap 89 may have a variety of useful configurations, preferably the proximate surfaces of the pole piece 85 and the armature 84 have a slope of approximately six to nine degrees with the tip of the frustoconical gap oriented toward the retainer 87 and the base oriented toward the housing 75. The non-magnetic washer is preferably brass, but may be bronze, plastic, stainless steel, or any other suitable non-magnetic material with spring-like characteristics. The washer can be similar in other respects to a washer as shown and described in U.S. Pat. No. 6,267,350, which is incorporated herein in its entirety by this reference.

A spacer 90 is disposed within the armature 84. The control member or pilot poppet 55 is slidably disposed in the axial poppet bore of the housing 75 and abuts the spacer 90. The pilot poppet 55 has a head with a circumference that is smaller than that of the poppet bore of the housing 75. The head of the pilot poppet 55 has a tip 91 that is seated in the restricted axial passageway 83 of the housing 75 when the movable member 45 of the valve 15 is in a closed position.

The cage 40 of the hydraulic valve 15 defining the generally cylindrical axial bore 43 which comprises the first port₁, the row of cross holes 41 comprising the second port₂, and a spring chamber 92. The spool 45 is slidably arranged in the axial bore 43 of the cage 40. The spool 45 has a generally cylindrical axial bore 93 and a spring chamber 94. A filter orifice 95 can be disposed in the bore 93 of the spool 45 and threadedly engaged therewith to retain the filter orifice 95 in fixed relation to the spool 45. The spool spring 47 is disposed in the spring chamber 92 of the cage 40 and the spring chamber 94 of the spool 45 with its upper end abutting the housing 75 and its lower end contacting a stepped portion in the axial bore 93 of the spool 45.

The filter orifice 95 can include an inlet 96 disposed in an inlet end of the insert, an outlet 97 disposed in an outlet end thereof, and an orifice 98 therebetween such that communication is established between the inlet 96 and the outlet 97 via the orifice 98. The filter orifice 98 can cooperate with the axial bore 93 of the spool 45 to define a filtered fluid passage therebetween. The filtered fluid passage is in communication with cross holes of the filter orifice 95 which lead to the orifice 98 defined by the filter orifice 95. The filter orifice 95 can be similar in operation to the filter 40 and the orifice 146 described in U.S. Pat. No. 7,137,406, which is incorporated herein by reference.

When the valve 15 is in the closed position, as shown in FIG. 4, the spool 45 and the cage 40 are in overlapping relationship with each other along the longitudinal axis of the valve 15 and are disposed in such proximity to each other along the transverse axis to provide a seal which substantially prevents the flow from the main passage to the cross holes defining the second port₂.

The valve 15 is shown in FIG. 4 in the closed position with no current applied to the coil 51. The first port₁ is adapted to be connected to the cylinder 22 of a lifting linkage system, which can comprise a source of pressurized fluid. The pressurized fluid in the cylinder 22 acts upon the first port₁. The fluid travels through the filter orifice 95 and into the spring chambers 94, 92 of the spool 45 and the cage 40. The fluid travels through the restricted axial passage 77 of the housing 75. The fluid acts against the tip 91 of the pilot poppet 55 that is seated in the restricted axial passage 77 of the housing 75, causing the pilot poppet 55 to move upward when force exerted by the pressurized fluid flowing from the first port₁ exceeds the spring force exerted by the pilot spring 73. At that point, the pilot poppet 55 moves upward, which in turn causes the spacer 90 and the armature 84 to move up as well, thereby allowing the fluid to move from the pilot orifice 83 through the transverse passageway 80 of the housing 75 and out of the hydraulic valve 15 via the third port₃ which is adapted to be a pilot tank connection. The upward movement of the armature 84 compresses the pilot spring 73. The pilot poppet 55 moves upward until the forces exerted by the pressurized fluid and the compressed pilot spring 73 reach equilibrium. As the force exerted by the pressurized fluid increases, the pilot poppet 55 moves up further and allows a greater volume of fluid to exit the hydraulic valve 15 via the third port₃ to the pilot tank connection. This flow, also referred to as the "pilot flow," causes the fluid pressure in the restricted axial passage 77 of the housing 75 and the spring chambers 92, 94 of the cage 40 and the spool 45 to drop below the fluid pressure at the first port₁. The resulting differential pressure across the spool 45 produces an upward force on the spool 45. When this upward force is sufficient to overcome the resiliency of the main spring 47, the spool 45 moves upward until fluid communication is established between the first port₁ and the second port₂.

When a current is applied to the coil 51 of the valve 15, a magnetic field is created that magnetizes the pole piece 85. If the current is sufficient, the resulting magnetic force causes the armature 84 to overcome the biasing force of the pilot spring 73 so that the armature 84 moves toward the pole piece 85. The upward motion of the armature 84 causes the spacer 90 to move up as well, thereby allowing pressure from fluid entering in the pilot orifice 83 of the housing 75 to push the pilot poppet 55 upward and allow the fluid to move from the pilot orifice 83 through the restricted axial passageway 77 of the housing 75 and out of the hydraulic valve 15 via the pilot tank connection established through the third port₃. As the upward magnetic force increases, the armature 84 moves up further and allows a greater volume of fluid to exit from the spring chambers 92, 94 of the cage 40 and the spool 45 via the pilot tank connection of the housing 75. In embodiments, a current can be applied to the coil 51 of the valve 15 such that force of the main spring 47 is balanced.

Embodiments of a hydraulic control system constructed according to principles of the present disclosure can be used to carry out a method of controlling a hydraulic system as described above. In embodiments, a method of controlling a hydraulic system following principles of the present disclosure can be used with any embodiment of a hydraulic valve according to principles discussed herein.

In one embodiment, a method of controlling a hydraulic circuit can be used to control a hydraulic circuit including a pump, a main control valve (MCV), a body, a hydraulic valve, a check assembly, a cylinder, and a tank. The body defines a valve cavity, a first port, a second port, and a third port. Each of the first port, the second port, and the third port are in fluid communication with the valve cavity. The first port is fluidly connected to the cylinder, the second port is fluidly connected to the MCV through which the second port is fluidly connected to a source of hydraulic fluid from the pump, and the third port is fluidly connected to the tank. The hydraulic valve is mounted to the body such that the hydraulic valve is at least partially disposed within the valve cavity. The hydraulic valve comprises an electro-proportional pressure valve and has a nose. The check assembly is disposed within the valve cavity and is in abutting relationship with the hydraulic valve such that the check assembly is seated against the nose of the hydraulic valve. The method includes performing a lifting operation in which a flow of pressurized hydraulic fluid is conveyed from the second port to the first port through the check assembly. A coil of the hydraulic valve is maintained in a de-energized condition during the lifting operation.

In embodiments, a lowering operation can be performed in which a flow of hydraulic fluid is conveyed from the first port to the second port through the hydraulic control valve. The coil of the hydraulic valve is energized during the lowering operation to proportionally reduce the effective force exerted by a main spring of the hydraulic cartridge valve.

In embodiments, if a loss of hydraulic fluid in the hydraulic circuit occurs, the flow of hydraulic fluid from the cylinder can be blocked to maintain the load in position by preventing the flow of hydraulic fluid from the first port to the second port through the check assembly. In embodiments, if the pressure in the cylinder exceed a predetermined limit, a pressure relieving operation can be performed in which hydraulic fluid is conveyed from the cylinder via the first port to the third port through the hydraulic valve by moving a movable member of the hydraulic valve by overcoming a force of a main spring of the hydraulic valve.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling a hydraulic circuit, the hydraulic circuit including a pump, a main control valve (MCV), a body, a hydraulic valve, a check assembly, a housing, a pilot poppet, a cylinder, and a tank, wherein:

the body defines a valve cavity, a first port, a second port, and a third port, each of the first port, the second port, and the third port being in fluid communication with the valve cavity, the first port being fluidly connected to the cylinder, the second port being fluidly connected to the MCV through which the second port is fluidly connected to a source of hydraulic fluid from the pump, and the third port being fluidly connected to the tank, the hydraulic valve being mounted to the body such that the hydraulic valve is at least partially disposed within the valve cavity, the hydraulic valve comprises an electro-proportional pressure valve and has a nose, and the check assembly is disposed within the valve cavity and is in abutting relationship with the hydraulic valve such that the check assembly is seated against the nose of the hydraulic valve, wherein the check assembly is configured to permit a flow of hydraulic fluid from the second port to the first port through the check assembly and to prevent the flow of hydraulic fluid from the first port to the second port through the check assembly, the housing fixed within the valve cavity of the body, the housing including a longitudinal passageway having an interior opening and an external opening, the longitudinal passageway being in communication with a transverse pilot passageway and a longitudinal bore, and the housing including a pilot seat circumscribing the interior opening of the longitudinal passageway, and the pilot poppet moveably disposed within the longitudinal bore of the housing, the pilot poppet adapted to sealingly engage the pilot seat, the method comprising:

performing a lifting operation in which a flow of pressurized hydraulic fluid is conveyed from the second port to the first port through the check assembly;

maintaining a coil of the hydraulic valve in a de-energized condition during the lifting operation.

2. The method of claim 1, further comprising:

performing a lowering operation in which a flow of hydraulic fluid is conveyed from the first port to the second port through the hydraulic control valve;

energizing the coil of the hydraulic valve during the lowering operation to proportionally reduce the effective force exerted by a main spring of the hydraulic cartridge valve.

3. The method of claim 1, further comprising:

blocking, when a loss of hydraulic fluid in the hydraulic circuit occurs, the flow of hydraulic fluid from the cylinder to maintain the load in position by preventing the flow of hydraulic fluid from the first port to the second port through the check assembly.

4. The method of claim 3, further comprising:

performing a pressure relieving operation when the pressure in the cylinder exceeds a predetermined limit in which hydraulic fluid is conveyed from the cylinder via the first port to the third port through the hydraulic valve by moving a movable member of the hydraulic valve by overcoming a force of a main spring of the hydraulic valve.

\* \* \* \* \*